United States Patent [19]

Bauer

[11] Patent Number: 5,154,406
[45] Date of Patent: Oct. 13, 1992

[54] APPARATUS FOR SHIFTING AND ORIENTING X-RAY FILMS IN MAGAZINES

[75] Inventor: Walter Bauer, Munich, Fed. Rep. of Germany

[73] Assignee: Agfa-Gevaert Aktiengesellschaft, Leverkusen, Fed. Rep. of Germany

[21] Appl. No.: 454,375

[22] Filed: Dec. 21, 1989

[30] Foreign Application Priority Data

Jan. 10, 1989 [DE] Fed. Rep. of Germany ... 8900217[U]

[51] Int. Cl.$^5$ .............................................. B65H 5/08
[52] U.S. Cl. ........................................ 271/11; 271/90; 271/104; 271/236; 271/245; 271/251
[58] Field of Search ............... 271/236, 250, 251, 3.1, 271/119, 106, 107, 104, 234, 253, 254, 116, 145, 184, 220, 245, 11, 90; 414/795.7, 797

[56] References Cited

U.S. PATENT DOCUMENTS

| | | | |
|---|---|---|---|
| 1,390,175 | 9/1921 | Stone | 221/213 |
| 3,306,491 | 2/1967 | Eisner et al. | 221/281 |
| 3,739,925 | 6/1973 | Martin | 271/220 X |
| 3,994,488 | 11/1976 | Takenaka et al. | 271/104 X |
| 4,017,066 | 4/1977 | Lasher et al. | 271/314 |
| 4,049,256 | 9/1977 | Church et al. | 271/236 |
| 4,362,298 | 12/1982 | Stefansson et al. | 271/236 |
| 4,379,549 | 4/1983 | Mizuma | 271/3.1 |
| 4,560,154 | 12/1985 | Nogi et al. | 271/119 |
| 4,566,682 | 1/1986 | Müller et al. | 271/250 X |
| 4,589,654 | 5/1986 | Kanoto | 271/236 |

FOREIGN PATENT DOCUMENTS

| | | | |
|---|---|---|---|
| 3122585 | 6/1985 | Fed. Rep. of Germany .. | |
| 127534 | 6/1986 | Japan | 271/107 |
| 257841 | 11/1986 | Japan | 271/119 |
| 147771 | 6/1988 | Japan | 271/220 |
| 212628 | 9/1988 | Japan | 271/119 |
| 1160164 | 7/1969 | United Kingdom | 271/116 |
| 1594488 | 7/1981 | United Kingdom | 271/251 |

*Primary Examiner*—Robert P. Olszewski
*Assistant Examiner*—Boris Milef
*Attorney, Agent, or Firm*—Peter K. Kontler

[57] ABSTRACT

Apparatus for shifting X-ray films in a magazine wherein films having different sizes form a stack and which as a straight or corner-shaped internal stop for properly oriented films. The apparatus has a frame which is reciprocable toward and away from the magazine and carries two or more pivotable links each of which supports one or more driven wheels movable into frictional engagement at least with the outermost film of the stack to shift the engaged film toward and against the stop. Properly oriented films are withdrawn from the magazine by one or more suction cups which share the movements of the links relative to the magazine. The wheels are rotated by a common prime mover.

21 Claims, 4 Drawing Sheets

APPARATUS FOR SHIFTING AND ORIENTING X-RAY FILMS IN MAGAZINES

BACKGROUND OF THE INVENTION

The invention relates to improvements in apparatus for manipulating sheet-like or panel-like objects, especially X-ray films. More particularly, the invention relates to improvements in apparatus for orienting sheet-like or panel-like objects (hereinafter referred to as films or X-ray films) in magazines wherein the films are stacked on top of or next to each other so that the oriented films are ready for removal from the magazine, e.g., by a withdrawing unit which is positioned in such a way that it can properly engage and withdraw only a fully oriented film.

It is customary to confine X-ray films in tightly sealed magazines which are provided with sealable openings to permit evacuation (e.g., by suction) of properly oriented films. Proper orientation of a film prior to withdrawal from the magazine is desirable and necessary if the magazine contains large, medium-sized and small films, i.e., if the films which are confined in the magazine merely overlie but do not necessarily register with each other.

It is already known to provide apparatus which are capable of orienting large, medium-sized and/or small films in a magazine prior to evacuation of films. The orientation normally involves a shifting of the film to be evacuated against a stop so that the thus shifted film is within the range of the film evacuating or withdrawing unit. Reference may be had to commonly owned German Pat. No. 31 22 585 to Müller et al. and to corresponding U.S. Pat. No. 4,566,682 which show (in FIGS. 3 to 5) a single wheel movable into frictional engagement with the exposed side of the outermost film of a stack of films in the magazine in order to shift the outermost film into contact with an internal stop of the magazine. The internal stop is a surface which extends at right angles to the planes of films in the magazine. The oriented film is thereupon engaged by a plurality of suction cups which extract it from the magazine.

A drawback of the patented apparatus is that it can properly orient only those films which are confined in a relatively small magazine. Thus the maximum length of a film must exceed half the length of the magazine; otherwise, the single wheel is likely to miss a relatively small film so that such film is not advanced into engagement with the stop and cannot be withdrawn from the magazine. Moreover, the single wheel of the patented apparatus cannot invariably ensure optimum orientation of a shifted film with reference to the stop in the magazine. For example, it can happen that only one corner of the shifted film contacts the stop so that, upon extraction from the magazine, the orientation of the film is far from satisfactory.

OBJECTS OF THE INVENTION

An object of the invention is to provide an apparatus which can orient small and large sheet- or panel-like objects with the same degree of reliability and accuracy.

Another object of the invention is to provide an apparatus which is designed to properly orient films having a size which is less than half the size of the magazine.

A further object of the invention is to provide an apparatus which can properly orient large, medium-sized and small sheet- or panel-like objects in any desired sequence and irrespective of the initial orientation of objects in their magazine.

An additional object of the invention is to provide an apparatus which can shift objects into engagement with straight or otherwise configurated stops.

Still another object of the invention is to provide the apparatus with novel and improved means for preventing an oriented object from attracting an adjacent object during withdrawal from the magazine.

A further object of the invention is to provide the apparatus with novel and improved means for simultaneously orienting two or more objects.

SUMMARY OF THE INVENTION

The invention is embodied in an apparatus for shifting randomly distributed sheet-like objects in a magazine wherein the objects form a stack of overlapping objects including an outermost object and the magazine has a stop (e.g., at least one plane surface) for shifted objects. The apparatus can be used with particular advantage for shifting randomly distributed X-ray films prior to their removal from the magazine and comprises a plurality of discrete supports (e.g., in the form of links or rockers), at least one rotary shifting element on each support, means for rotating the shifting elements, and means for effecting a movement of the magazine and the supports relative to each other so as to place at least one of the shifting elements into engagement at least with the outermost object of the stack in the magazine and to shift the thus engaged object or objects toward the stop of the magazine.

The apparatus can further comprise means for coupling the supports to each other, and the rotating means can comprise a common prime mover for all of the shifting elements.

As stated above, the supports can include rockers or links which are pivotable relative to each other about at least one first axis, and the shifting elements are rotatable or can be mounted for rotation about second axes which are substantially parallel to the first axis.

The rotating means can comprise the aforementioned common prime mover and gear trains which transmit torque from the prime mover to the shifting elements. The numbers of gears in the gear trains are preferably such that all of the shifting elements rotate in the same direction. The output element of the prime mover can be constructed and mounted to drive each of the gear trains.

Alternatively, the rotating means can comprise the aforementioned common prime mover and at least one endless flexible element (such as a chain or a belt) which transmits torque from the prime mover to the shifting elements.

In accordance with one presently preferred embodiment of the apparatus, the supports include two substantially mirror symmetrical rockers or links which are pivotable about parallel axes defined by the movement effecting means. The stop of the magazine is substantially parallel to such axes when the apparatus is in actual use. The rotating means can include overload clutches which enable the shifting elements to come to a standstill when the resistance which the objects in the magazine offer to rotation of the shifting elements exceeds a predetermined value. The dimensions of one of the rockers or links can match the dimensions of the other rocker or link.

In accordance with another presently preferred embodiment of the improved apparatus, the supports include a first rocker or link which is pivotable about a first axis and carries a first shifting element which is rotatable about a second axis, a second rocker or link which is pivotable about the second axis and carries a second shifting element rotatable about a third axis, and a third rocker or link which is pivotable about the third axis and carries a third shifting element rotatable about a fourth axis. The first axis can be defined by the movement effecting means, and all of the axes are or can be parallel to each other. The first axis can be parallel or nearly parallel to the stop of the magazine.

The stop of the magazine can constitute a composite stop which is composed of two mutually inclined sections defining a corner and being disposed at a predetermined angle (e.g., 90°) to each other. The movement effecting means of such apparatus can include means for selecting the positions of shifting elements and the corner relative to each other in such a way that the axes of the shifting elements are inclined with reference to the sections of the stop. The arrangement may be such that the pivot axes of the supports which carry the shifting elements are substantially normal to a line which halves the angle between the sections of the corner when the magazine and the supports are properly positioned with reference to each other for shifting of the outermost object into engagement with the sections of the composite stop.

The apparatus further comprises or cooperates with means for withdrawing shifted objects from the magazine (i.e., for withdrawing objects which are properly oriented with reference to the stop in the magazine). The withdrawing means can be mounted on the movement effecting means, i.e., the withdrawing means is preferably movable with the supports with reference to the magazine if the supports are (normally pivotably) mounted on the movement effecting means (the latter can include a reciprocable frame having one or more shafts for pivotally mounting one of a chain of two or more supports or each of a plurality of independently pivotable supports, i.e., the movement effecting means can be said to constitute a means for coupling the supports to each other if each support is pivotable independently of the other support or supports). Such apparatus can further comprise means for agitating the withdrawing means with reference to the movement effecting means in order to reduce the likelihood of adherence of a non-oriented object to an oriented object which is in the process of being withdrawn from the magazine. The agitating means can comprise a vibrator system including a motor-driven eccentric which is coupled to the withdrawing means. The apparatus can further comprise control means with means for synchronizing the operation of rotating means with that of the movement effecting means as well as with that of the withdrawing means. Signal generating means (e.g., in the form of limit switches or proximity detector switches) can be provided to transmit to the control means signals denoting the positions of the supports and/or the withdrawing means with reference to the magazine and with reference to the objects in the magazine.

The rotating means can include a prime mover having means for limiting the magnitude of torque which can be transmitted to the shifting elements. The motor can be a reversible electric motor.

The peripheral object-engaging surface of at least one of the shifting elements can include smoother and coarser portions. Such smoother and coarser portions are preferably provided on the peripheral surface of that shifting element which is nearest to the stop when the magazine and the supports are properly positioned with reference to each other for shifting of the outermost object of the stack toward the stop. Alternatively, the entire peripheral surface of at least one of the shifting elements can exhibit the same degree of finish which is midway between the coarsest and smoothest finish.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
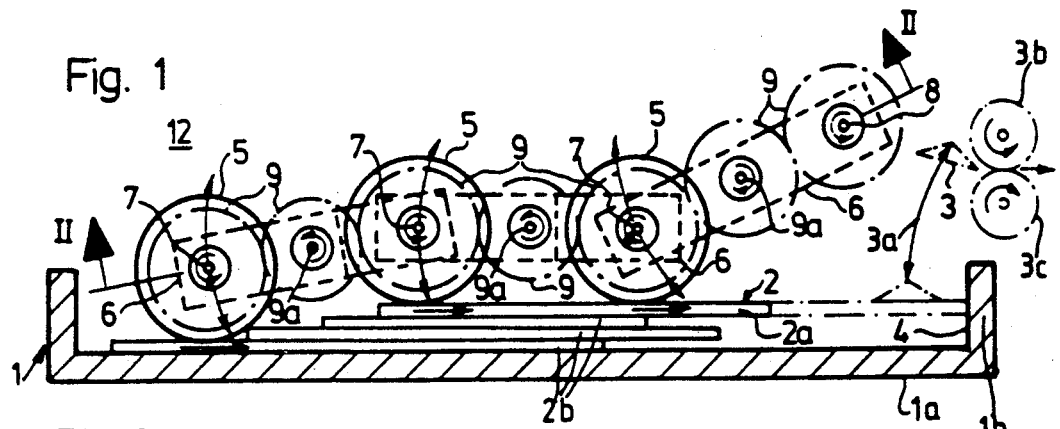
FIG. 1 is a longitudinal sectional view of a magazine for a stack of X-ray films and an elevational view of a portion of an apparatus which embodies one form of the invention and wherein the supports are elongated rockers or links which are articulately connected to each other substantially end-to-end, the means for withdrawing discrete films from the magazine being indicated schematically by phantom-lines.

FIG. 1 shows a portion of a magazine 1 for storage of a stack 2 of sheet-like objects 2b, particularly X-ray films, which are not or need not be aligned with each other and normally include smaller and larger objects (hereinafter called films for short). The stack 2 in the magazine 1 includes an outermost or topmost film 2a which is remotest from the bottom wall 1a of the magazine. The purpose of the novel apparatus 12 is to move at least the outermost film 2a of the stack 2 against an abutment or stop 4 (shown in FIG. 1 as the flat inner side or surface of the right-hand sidewall 1*b* of the magazine). Once the outermost film 2*a* lies against and is oriented by the stop 4, it is ready to be withdrawn from the magazine 1 by a withdrawing unit including one or more suction cups 3 movable between two spaced-apart positions in directions indicated by a double-headed arrow 3*a* and serving to deliver the leader of the outermost film 2*a* into the nip of two advancing rolls 3*b*, 3*c*. The manner in which the rolls 3*b*, 3*c* advance the film 2*a* and the destination of the film 2*a* form no part of the present invention. As a rule, the magazine 1 is closed and at least substantially sealed and is designed in such a way that the suction cup or cups 3 can withdraw the outermost film 2*a* only when the magazine 1 assumes a predetermined position with reference to the withdrawing unit (or vice versa) and when at least the major part of the leader of the film 2*a* abuts the stop 4.

The apparatus 12 comprises a plurality of discrete supports 6 in the form of elongated rockers or links (hereinafter called links for short) which are articulately connected to each other end-to-end and each of which carries at least one substantially wheel- or roller-shaped rotary shifting element 5. The peripheral surfaces of the shifting elements 5 (hereinafter called wheels) can be caused to engage the outermost film 2*a* or two or more films 2*b* of the stack 2 in the magazine 1 when the latter is caused to assume (with reference to the links 6) the position which is shown in FIG. 1 and/or vice versa. The means (108) for effecting a movement of the magazine 1 relative to the links 6 and/or vice versa is shown in and will be described with reference to FIG. 8. The means for rotating the wheels 5 is constructed, mounted and operated in such a way that all of the wheels are caused to rotate in a counterclockwise direction (as seen in FIG. 1) in order to frictionally engage and transport the adjacent film or films toward the stop 4.

Figure 2:
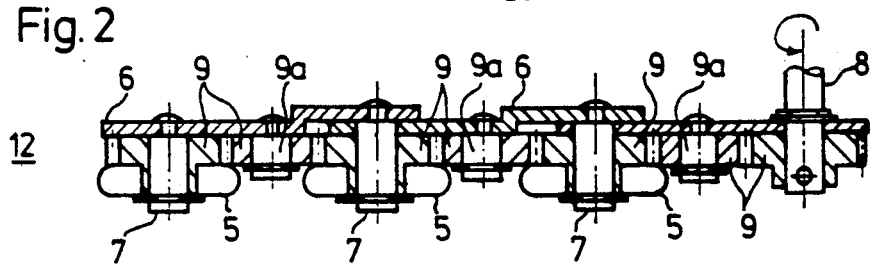
FIG. 2 is a sectional view of the supports and of the respective shifting elements, substantially as seen in the direction of arrows from the line II—II of FIG. 1.

The links 6 are pivotable about axes which are parallel to the stop 4 when the apparatus 12 is in actual use. Such axes are defined by two of a total of three pivot members 7. The right-hand pivot member 7 of FIGS. 1 and 2 defines a pivot axis for the median link 6 and an axis of rotation for the wheel 5 on the right-hand link, and the median pivot member 7 defines a pivot axis for the left-hand link 6 as well as an axis of rotation for the respective wheel 5. The left-hand end portion of the leftmost link 6 carries a further pivot member 7 which defines an axis of rotation for the respective film-shifting wheel 5. A fourth pivot member in the form of a shaft 8 defines a pivot axis for the rightmost link 6 and simultaneously serves to couple the rightmost link to the aforementioned movement effecting means 108.

The means for rotating the wheels 5 about their respective axes comprises a common prime mover 10 (FIG. 8) and gear trains including mating spur gears 9 and shafts 9*a* which rotatably mount the gears 9 in or on the respective links 6. Each wheel 5 is coaxial with and is rotated by one of the gears 9. All of the gears 9 receive torque from the pivot member or shaft 8. The number of gears 9 in each gear train is selected with a view to ensure that all of the wheels 5 rotate in the same direction when the prime mover 10 is on and its output element 10*a* transmits torque to the shaft 8. The prime mover 10 can constitute a reversible electric motor which is designed to transmit limited torque, i.e., the motor will cease to rotate the shaft 8 when the latter begins to offer a predetermined maximum resistance to rotation. This ensures that the wheels 5 cannot slip relative to the adjacent film or films and cannot damage the films and/or undergo damage as a result of spinning relative to the film or films in the stack 2. The weight of the links 6 and of the parts which are carried thereby can be selected in such a way that, if the bottom wall 1*a* of the magazine 1 is substantially horizontal and the wheels 5 rest on the adjacent film or films 2*b* by gravity, the force of gravity suffices to ensure that the film or films which are engaged by one or more wheels 5 will be shifted toward and into engagement with the stop 4 when the motor 10 is on.

The number of links 6 can be reduced to two or increased to four or more. Furthermore, each link 6 can carry several film-shifting wheels 5. For example, each pivot member 7 can mount two coaxial wheels 5.

Figure 5:
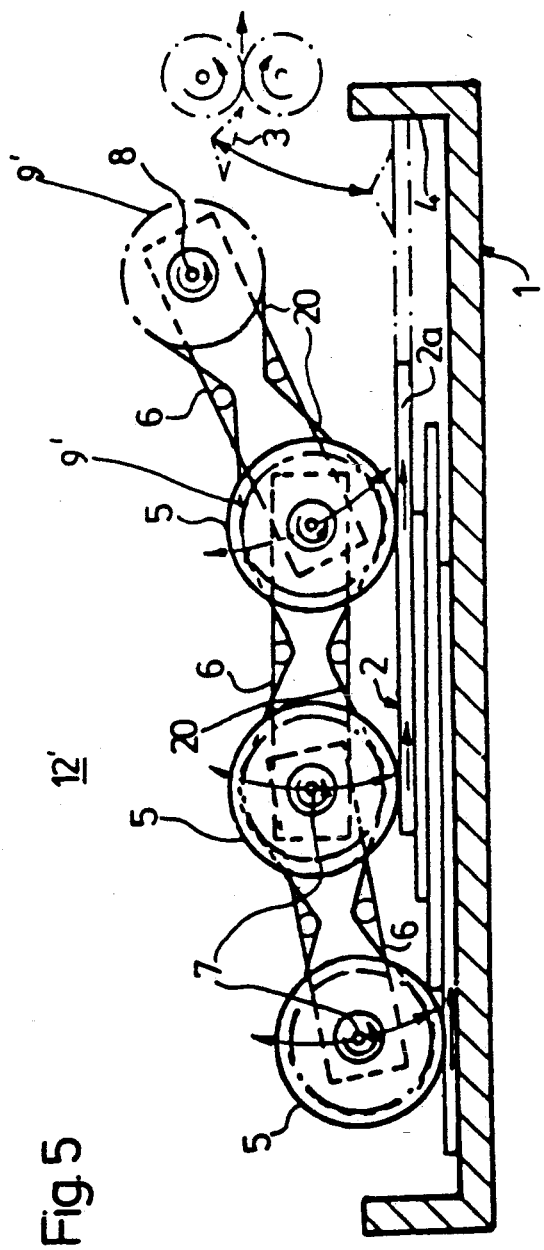
FIG. 5 is a view similar to that of FIG. 1 but showing a portion of an apparatus constituting a modification of the apparatus of FIGS. 1—2 and employing rotating means with one or more endless flexible elements serving to drive the shifting elements on the supports.

The links 6 of the apparatus 12′, a portion of which is shown in FIG. 5, are or can be identical with the links 6 of the apparatus of 12. The difference between the apparatus 12 and 12′ is that the means for rotating the wheels 5 in the apparatus 12′ comprises pulleys 9′, one on each pivot member 7 and one on the shaft 8, and endless flexible elements 20 which are trained over the pulleys 9′ to transmit torque to the respective wheels when the prime mover (not shown) for the shaft 8 is on. The flexible elements 20 can constitute endless chains or endless (toothed or smooth-surfaced) belts. Thus, the pulleys 9′ are provided with teeth if the flexible elements 20 are chains or toothed belts, and the pulleys 9′ are devoid of teeth if the flexible elements 20 are smooth-surfaced endless belts.

Figure 3:
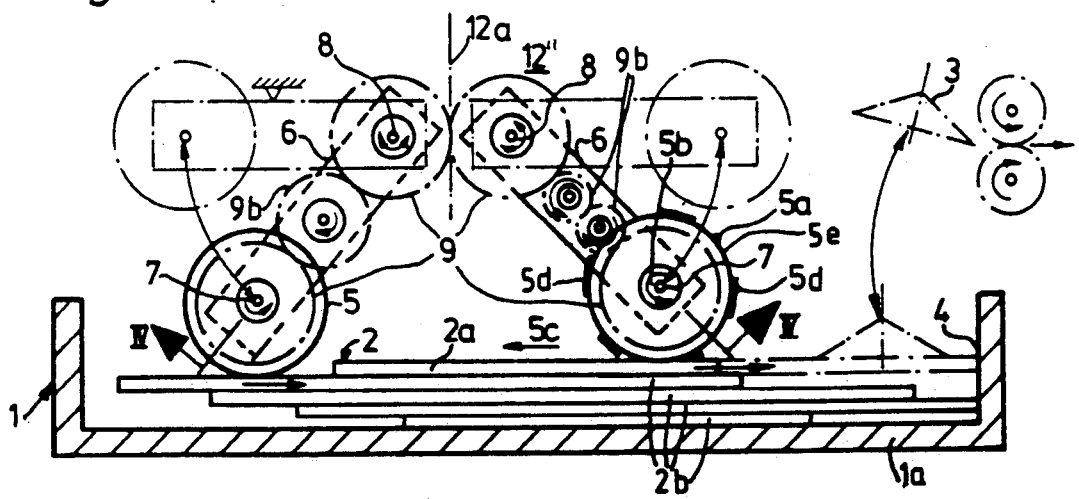
FIG. 3 is a view similar to that of FIG. 1 but showing a portion of a modified apparatus with two mirror symmetrical supports in the form of rockers or links.
Figure 4:
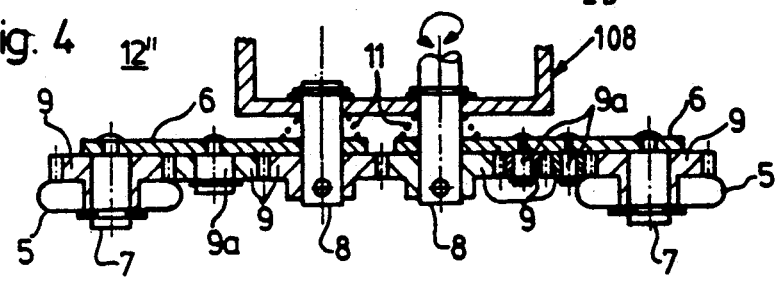
FIG. 4 is a sectional view of the supports and of the respective shifting elements, substantially as seen in the direction of arrows from the line IV—IV of FIG. 3.

FIGS. 3 and 4 show a magazine 1 with a stop 4 and a third apparatus 12″ which comprises two links 6. These links 6 are mirror symmetrical to each other with reference to a plane 12*a* which is disposed midway between the two shafts 8 and is parallel to the stop 4 of the magazine 1 when the apparatus 12″ is ready for use. The means 108 for effecting movements between the magazine 1 and the links 6 carries the links in such a way that the distance between the axes of the shafts 8 is or can be a fixed distance. Thus, the movement-effecting means 108 serves to couple the links 6 to each other in such a way that each link is pivotable or rockable about the axis of the respective shaft 8.

The means for rotating the wheels 5 on the links 6 comprises two gear trains with different numbers of gears As can be seen in FIGS. 3 and 4, each gear train comprises a relatively large gear 9 on the respective shaft 8, a relatively large gear 9 on the pivot member 7 for the respective wheel 5, and one or two relatively small intermediate gears 9*b*. The prime mover 10 can rotate the gear 9 on the right-hand shaft 8 or the gear 9 on the left-hand shaft 8 because these gears mesh in the region of the symmetry plane 12.

The links 6 of FIGS. 3 and 4 can be pivoted about the axes of the respective shafts 8 between the phantom-line (retracted) positions and the solid-line (operative) positions in which their wheels 5 rest on and frictionally engage the adjacent film 2*a* or films 2*a*, 2*b* of the stack 2 in the magazine 1. The movement effecting means 108 is a frame or case which rotatably mounts the shafts 8 and further carries two overload clutches, one for each of the links 6. The clutches include coil springs 11 which react against the frame 108 and bear against the respective links 6 (see FIG. 4) so as to enable the links 6 to come to a halt while the respective shafts 8 rotate with their springs 11 relative to the links if the links encounter a certain resistance to angular movement about the axes of their respective shafts 8. Moreover, the springs 11 enable the corresponding links 6 to urge their wheels 5 into requisite frictional engagement with the adjacent film 2a or films 2a, 2b in the magazine 1. The links 6 are rotatable on the respective shafts 8 and receive torque from the springs 11 when the shafts 8 are driven by the prime mover 10. The magnitude of the force which tends to pivot the links 6 depends upon the bias of the preferably conical springs 11. If the springs 11 are connected to the respective links 6 and the shafts 6 can turn relative to the springs 11, the magnitude of the force with which the links 6 are pivoted depends upon the force which must be overcome to enable the shafts 8 to turn relative to the springs 11.

Another difference between the apparatus 12 or 12' on the one hand and the apparatus 12" on the other hand is that the right-hand wheel 5 of FIGS. 3 and 4 exhibits a tendency to come into more pronounced frictional engagement with the adjacent film (2a) when the latter reaches and abuts the stop 4 of the magazine. The right-hand wheel 5 then exhibits the tendency to move in the direction of arrow 5c (i.e., away from the stop 4) so that, since the distance of the right-hand shaft 8 from the bottom wall 1a of the magazine 1 is then constant, the right-hand link 6 of FIGS. 3 and 4 tends to pivot in a clockwise direction (about the axis of the right-hand shaft 8). The same situation arises if the film (2a of FIG. 3) which is engaged by the right-hand wheel 5 tends to adhere to the neighboring film 2b of the stack 2 in the magazine 1. The direction in which the right-hand wheel 5 rotates is indicated by the arrow 5b. It can be said that the force with which the right-hand wheel 5 bears against the adjacent film 2a is the sum of two forces, namely of the vertical component of a force which is generated by the spring 11 of the respective overload clutch and of the vertical component of the force which develops as a result of frictional engagement between the peripheral surface 5a of the right-hand wheel 5 and the adjacent film 2a. It is assumed here that the bottom wall 1a of the magazine 1 of FIG. 3 is horizontal or substantially horizontal. The aforementioned components of the two forces are normal to the plane of the film 2a which is engaged by the right-hand wheel 5.

The magnitude of friction between the righthand wheel 5 and the film 2a of FIG. 3 depends upon the force with which the wheel bears upon the film 2a. Consequently, the apparatus 12" of FIGS. 3 and 4 is self-locking as soon as the film 2a reaches the stop 4 or as soon as the resistance of the film 2a to displacement relative to the adjacent film 2b reaches a predetermined value irrespective of whether or not the film 2a already abuts the stop 4. In order to avoid damage to films of the stack 2 in the magazine 1 of FIG. 3, the prime mover 10 which drives the right-hand shaft 8 is designed to transmit a limited amount of torque. Damage to films is also avoided by appropriate selection of the angle between the longitudinal direction of the right-hand link 6 and the plane of the film 2a at the time the latter is engaged by the right-hand wheel 5 of FIGS. 3 and 4. Still further, damage to the film 2a can be avoided by the additional expedient of properly selecting the finish of the peripheral surface 5a of the right-hand wheel 5, i.e., by properly selecting friction which can develop between the peripheral surface 5a and the adjacent exposed surface of the film 2a in the magazine 1. For example, the peripheral surface 5a of the right-hand wheel 5 (or of each wheel 5) can be selected in such a way that (coarser) portions having a higher coefficient of friction alternate with (smoother) portions having a lower coefficient of friction with the film 2a. This is indicated in FIG. 3 by heavier and thinner lines 5d and 5e, respectively. The lines 5d denote surface portions having a very high coefficient of friction with the film 2a and the lines 5e denote surface portions having a very low coefficient of friction. This can be readily achieved by roughening the surface portions 5d while the surface portions 5e remain smooth or by smoothing the surface portions 5e while the surface portions 5d remain untreated.

An advantage of a wheel 5 wherein the peripheral surface 5a exhibits portions 5d, 5e having different coefficients of friction with the adjacent surface of the film 2a is that, if the film 2a happens to strongly adhere to the adjacent film 2b while its leader is still remote from the stop 4, a relatively coarse surface portion 5d is highly likely to terminate the bond between the film 2a and the adjacent film 2b in order to ensure that the film 2a will indeed advance toward and actually reach the stop 4. Such separation of the film 2a from the adjacent film 2b is even more likely if the respective wheel 5 is rotated at a relatively high speed so that a coarse surface portion 5d is likely to abruptly engage the exposed surface of the film 2a as soon as the respective link 6 descends to the position which is shown in FIG. 3 by solid lines. It has been found that a wheel 5 with surface portions 5d and 5e is highly unlikely to leave the outermost film 2a in a position in which the leader of the film 2a is spaced apart from the stop 4. Moreover, such shifting of the film 2a takes place without any damage thereto. It is clear that the peripheral surface 5a of the right-hand wheel 5 of FIGS. 3 and 4 can include alternating portions having three or even more different finishes, for example, portions of coarse finish, portions of slightly coarse finish, portions of relatively smooth finish and portions of very smooth finish. Each wheel 5 can have a peripheral surface with two or more sets of portions having different finishes.

Figure 6:
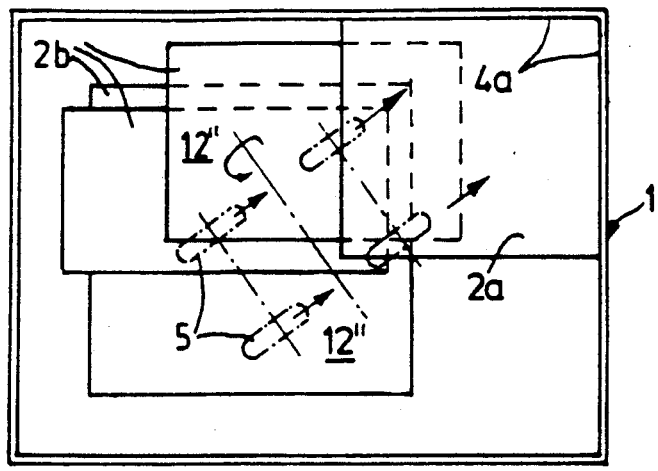
FIG. 6 is a smaller-scale diagrammatic plan view of a magazine and of certain parts of two apparatus of the type shown in FIGS. 3-4.

FIG. 6 shows a magazine 1 in plan view. The magazine is disposed at a level beneath two apparatus 12" of the type shown in FIGS. 3 and 4. The composite stop 4a in this magazine includes two internal surfaces or sections which are disposed at right angles to each other. The right-hand wheels 5 of the two apparatus 12" have completed the shifting of the relatively small outermost film 2a into proper engagement with the stop 4a, and the left-hand wheels 5 of the two apparatus 12" are in the process of advancing two discrete films 2b toward the same stop. The axes of the wheels 5 are inclined with reference to each of the two surfaces or sections which jointly form the stop 4a. When the outermost film 2a is withdrawn from the magazine 1 of FIG. 6, the two right-hand wheels 5 engage the next or fresh outermost film (namely the topmost film 2b of the stack in the magazine 1 of FIG. 6) to complete (if necessary) its shifting toward and into engagement with the stop 4a so that the withdrawing unit (not shown in FIG. 6) can readily remove the film from the magazine.

It is clear that one of the apparatus 12" of FIG. 6, or each of these apparatus, can be replaced with an apparatus 12 or 12'.

The pivot axes of the links 6 (not shown in FIG. 6) are preferably normal to the line which halves the right angle between the mutually inclined surfaces or sections of the composite stop 4a.

Figure 7:
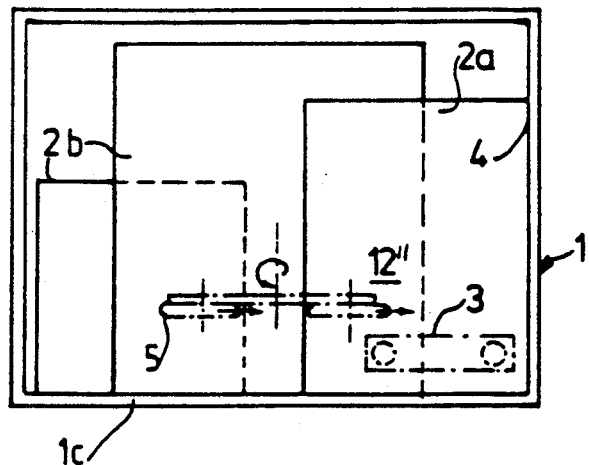
FIG. 7 is a similar diagrammatic plan view of a magazine and of certain parts of a single apparatus of the type shown in FIGS. 3 and 4.

FIG. 7 illustrates the magazine 1 of FIG. 3 in a plan view and further shows the apparatus 12" of FIGS. 3-4.

This apparatus is adjacent one longitudinal sidewall 1c of the magazine 1 and has already completed advancement of the outermost film 2a into engagement with the straight stop 4. The other two films 2b are yet to be advanced into actual engagement with the stop 4. The magazine 1 of FIG. 7 is assumed to be maintained in an upright position so that the longitudinal sidewall 1c is located at a level below the other three sidewalls and the lower marginal portions of the films 2a, 2b rest on the sidewall 1c. This ensures that each and every film (2a or 2b) can be reached by the wheels 5 of the apparatus 12" because the latter is adjacent the sidewall 1c and the distance between its wheels 5 is such that at least one of these wheels can frictionally engage the smallest or the largest film in the magazine 1. The apparatus 12" of FIG. 7 can be replaced with the apparatus 12 of FIGS. 1-2 or with the apparatus 12' of FIG. 5.

Figure 8:
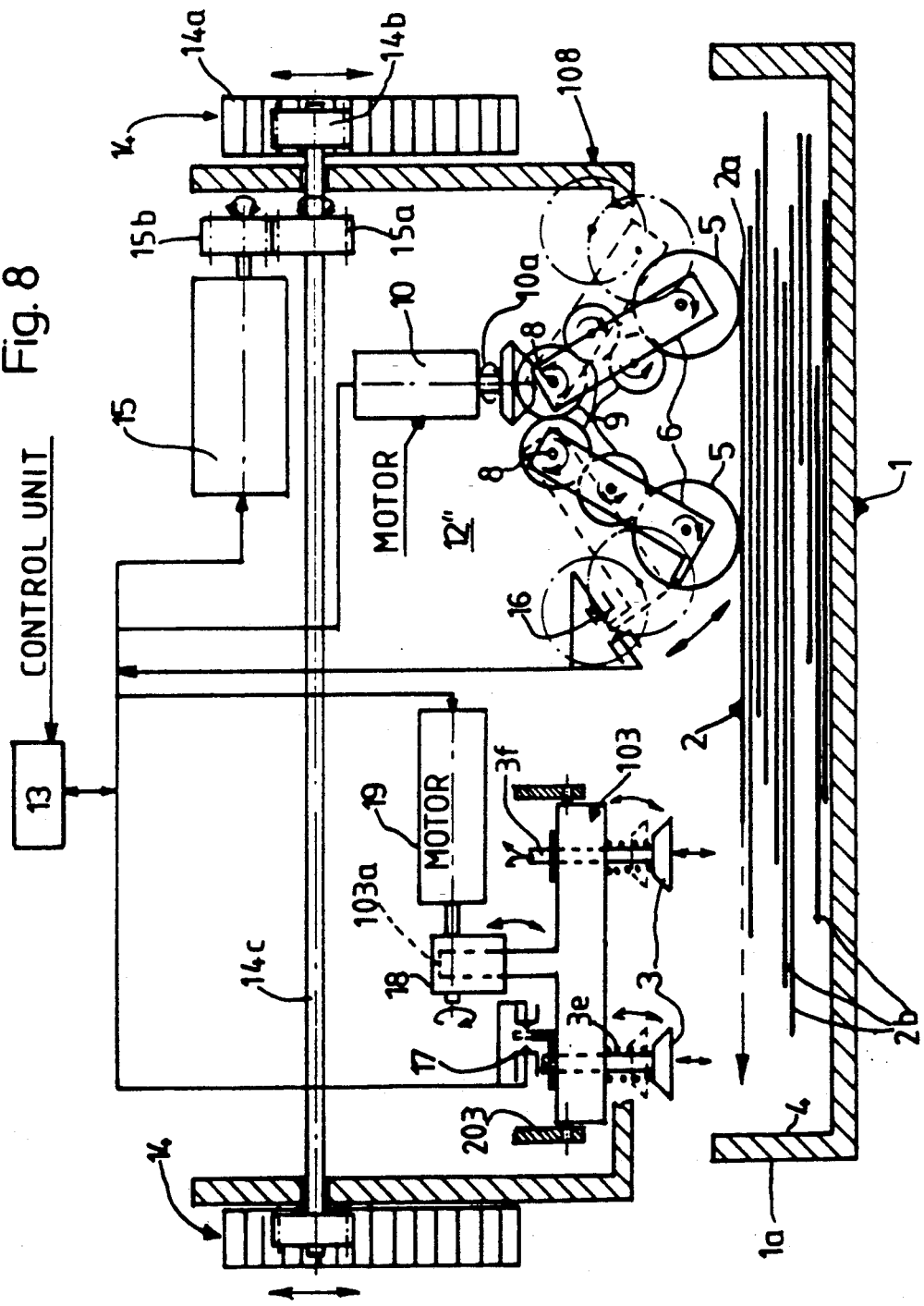
FIG. 8 is a sectional view of a magazine and further shows, partly in a vertical sectional view, a complete apparatus embodying supports similar to those shown in FIGS. 3-4 and further comprising controls for the rotating means, for the means for effecting movements of the magazine and the supports relative to each other and for the means for withdrawing discrete films from the magazine.

FIG. 8 shows a complete apparatus 12" including the reversible prime mover 10 having an output element 10a which drives the gear 9 (see FIG. 3 or 4) on the right-hand shaft 8 and is thereby in a position to rotate the two wheels 5 in a clockwise direction (because the stop 4 of the magazine 1 which is shown in FIG. 8 is defined by the left-hand sidewall 1a).

In order to withdraw the outermost film 2a of the stack 2 of films 2b in the magazine 1 of FIG. 1, the frame 108 with its two shafts 8 is lowered by two rack and pinion mechanisms 14. Each of these mechanisms comprises a stationary rack 14a and a pinion 14b. The pinions 14b are mounted on a common shaft 14c which is driven by a reversible electric or other suitable motor 15 through the medium of gears 15a, 15b. The motor 15 and the shaft 14c are installed in the frame 108, the same as the prime mover 10. The frame 108 further carries the film withdrawing unit which, in the embodiment of FIG. 8, comprises a plurality of suction cups 3 adjacent the stop 4. The means for guiding the frame 108 when the frame is in motion as a result of rotation of the pinions 14b (i.e., while the frame 108 moves up or down, as seen in FIG. 8) is not shown in the drawing.

The operation of the prime mover 10, motor 15 and the film withdrawing unit is synchronized by an electronic control unit 13 of any suitable design.

Prior to shifting of the outermost film 2a in the magazine 1 of FIG. 8, the links 6 of the apparatus 12" are maintained in the phantom-line positions of FIG. 8. The control unit 13 then causes the prime mover 10 to turn the shafts 8 in directions to pivot the links 6 to the solid-line positions of FIG. 8. The motor 15 receives a signal to lower the frame 108 whereby the wheels 5 engage the outermost film 2a of the stack 2 and move apart, i.e., the links 6 are pivoted by the stack 2 to move from the solid-line positions toward the phantom-line positions of FIG. 8 and to ultimately actuate one or more limit switches or proximity detector switches 16 which transmit a signal to the control unit 13. The motor 15 then comes to a halt so that the rotating wheels can shift the film 2a into contact with the stop 4 of the magazine 1. Alternatively, the switch 16 can be used to indicate that the wheels 5 are disengaged from the stack 2. The limit switch or proximity switch 16 signals the home position of the shifting apparatus 12. The control unit 13 activates the withdrawing unit only if the sheets are oriented and the shifting apparatus is out of the way. Hence, for a proper operation of the sheet manipulating apparats, the control unit 13 must receive from the switch 16 a signal denoting the home position of the shifting apparatus 12.

The next step involves a further lowering of the frame 108 with the carrier 103 of the suction cups 3. These suction cups are biased by springs 3c which yield and enable the shanks 3f of the suction cups to rise when the suction cups engage the film 2a whereby one of these shanks actuates a proximity detector or limit switch 17 which transmits to the control unit 13 a signal denoting that the suction cups 3 are in proper positions to attract the aligned film 2a from the magazine 1. Such extraction or withdrawal takes place in response to transmission of a signal to the motor 15 which causes the frame 108 to rise, i.e., the suction cups 3 lift the outermost film 2a off the adjacent film 2b in the stack 2.

In order to ensure that the uppermost film 2b of the stack in the magazine 1 will not adhere to the film 2a while the latter is being lifted by the suction cups 3, the apparatus 12" of FIG. 8 preferably further comprises means for agitating (e.g., vibrating) the carrier 103 and the suction cups 3, at least while the carrier 103 is in the process of moving above and away from the magazine 1. The agitating means of FIG. 8 comprises a motor 19 which receives start and stop impulses from the control unit 13 and drives an eccentric 18 which is suitably coupled to and can move up and down an extension 103a of the carrier 103. The latter is movable up and down in or with suitable guide means 203 in the frame 108. The manner in which a lifted film (such as the film 2a of the stack 2 shown in FIG. 8) is transferred from the suction cup 3 into the nip of the rolls 3b, 3c (not shown in FIG. 8) forms no part of the present invention.

When the film is detached from the suction cups 3 and is moved out of the way, the apparatus of FIG. 8 is ready to shift and withdraw the outermost film (i.e., the uppermost film 2b) of the remainder of the stack 2 in the magazine 1.

Each of the rolls 3b, 3c can constitute a one-piece elongated cylinder or it can comprise a set of two or more abutting or spaced-apart short cylinders on a common shaft.

An advantage of the improved apparatus is that its plural wheels 5 can cover a large part of the area within the magazine 1. Thus, the size of a film can be much smaller than the size of the area within the four sidewalls of the magazine, as long as the positioning of one or more apparatus 12, 12' and/or 12" relative to the magazine 1 (and/or vice versa) is such that at least one wheel 5 necessarily engages and shifts the smallest film irrespective of initial position of the smallest film in the interior of the magazine. Moreover, the wheels 5 of the improved apparatus are more likely to engage even the smallest film in a region other than only along one of the margins which also contributes to more reliable shifting of the films toward optimum engagement with the stop. All in all, the differences between the largest and the smallest films in the magazine 1 can be much more pronounced than heretofore and the likelihood of shifting a large, medium-sized or small (including very small) film to an optimum position for withdrawal from the magazine is much more pronounced than if one were to employ a conventional apparatus.

A further important advantage of the improved apparatus is that, at least in many instances, the wheels 5 of the selected apparatus simultaneously engage and shift two or even more films. This contributes to a higher output of the improved apparatus. Thus, if the outermost film has already been shifted beyond one or more wheels, such wheel or wheels engage the adjacent film or films to at least partially shift the adjacent film or films toward the stop in the magazine. In other words, the improved apparatus, as well as a combination of two or more improved apparatus, can simultaneously shift two or more films in such a manner that at least one of the films is shifted all the way into proper engagement with the stop 4 or 4a and the other film or films are at least partially advanced toward engagement with the stop.

The motor 10 can be of the type known as PH 264/01 distributed by Oriental of Japan.

The control unit 13 of FIG. 8 can constitute a microprocessor of the type known as 80 188 produced by Intel of United States of America.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for shifting randomly distributed sheets of different sizes in a magazine wherein the sheets form a stack of overlapping sheets including an outermost sheet and the magazine has a stop for shifted sheets, comprising a plurality of overload clutches including discrete supports; a plurality of rotary shifting elements including at least one rotary shifting element on each of said supports; means for rotating said shifting elements; and means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop of the magazine, said supports including two substantially mirror symmetrical links which are pivotable about parallel axes relative to said movement effecting means, the stop of the magazine being substantially parallel to said axes, said overload clutches further comprising means which enable said elements to come to a standstill when the resistance which the sheets in the magazine offer to rotation of said elements exceeds a predetermined value.

2. The apparatus of claim 1, wherein said rotating means comprises a prime mover and said means which enable said elements to come to a standstill comprise gear trains which transmit torque from said prime mover to said shifting elements.

3. The apparatus of claim 2, wherein the numbers of gears in said gear trains are such that all of said shifting elements rotate in the same direction.

4. The apparatus of claim 3, wherein said prime mover has an output element which drives each of said gear trains.

5. The apparatus of claim 1, wherein the dimensions of one of said links match the dimensions of the other of said links.

6. The apparatus of claim 1, further comprising means for withdrawing shifted sheets from the magazine, said withdrawing means being mounted on said movement effecting means.

7. Apparatus for shifting randomly distributed sheets in a magazine wherein the sheets form a stack of overlapping sheets including an outermost sheet and the magazine has a stop for shifted sheets, comprising a plurality of discrete supports; a plurality of rotary shifting elements including at least one rotary shifting element on each of said supports, said supports including a first link which is pivotable about a first axis and carries a first shifting element rotatable about a second axis, a second link which is pivotable about said second axis and carries a second shifting element rotatable about a third axis, and a third link pivotable about said third axis and carrying a third shifting element which is rotatable about a fourth axis; means for rotating said shifting elements; and means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop in the magazine.

8. The apparatus of claim 7, wherein said first link is pivotable about said first axis relative to said movement effecting means and said axes are parallel to each other.

9. The apparatus of claim 7, wherein said first link is pivotable about said first axis relative to said movement effecting means and is parallel to the stop of the magazine.

10. Apparatus for shifting randomly distributed sheets in a magazine wherein the sheets form a stack of overlapping sheets including an outermost sheet and the magazine has a stop for shifted sheets, comprising a plurality of discrete supports; a plurality of rotary shifting elements including at least one rotary shifting element on each of said supports; means for rotating said shifting elements; means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop in the magazine; means for withdrawing shifted sheets from the magazine, said withdrawing means being mounted on said movement effecting means; and means for agitating said withdrawing means with reference to said movement effecting means, said agitating means comprising a motor-driven eccentric coupled to said withdrawing means.

11. Apparatus for shifting randomly distributed sheets in a magazine wherein the sheets form a stack of overlapping sheets including an outermost sheet and the magazine has a stop for shifted sheets, comprising a plurality of discrete supports; a plurality of rotary shifting elements including at least one rotary shifting element on each of said supports; means for rotating said shifting elements; means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop of the magazine; means for withdrawing shifted sheets from the magazine, said withdrawing means being mounted on said movement effecting means; and control means including means for synchronizing the operation of said rotating means and said movement effecting means with that of said withdrawing means.

12. Apparatus for shifting randomly distributed sheets in a magazine wherein the sheets form a stack of overlapping sheets including an outermost sheet and the magazine has a stop for shifted sheets, comprising a plurality of discrete supports; a plurality of rotary shifting elements including at least one rotary shifting element on each of said supports; means for rotating said shifting elements; means for effecting a movement of the magazine and said supports relative to each other so as to place at least one of said shifting elements into engagement at least with the outermost sheet of the stack in the magazine whereby the at least one shifting element shifts the thus engaged sheet toward the stop of the magazine; means for withdrawing shifted sheets from the magazine, said withdrawing means being movable with said supports relative to the magazine; and signal generating means denoting the positions of said supports and said withdrawing means with reference to the magazine.

13. Apparatus for shifting randomly distributed sheets of different sizes in a magazine wherein the sheets form a stack of overlapping sheets including an outermost sheet and the magazine has a stop for shifted sheets, comprising a plurality of discrete supports; a plurality of rotary shifting elements including at least one rotary shifting element on each of said supports; means for rotating said shifting elements; means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop of the magazine; and means for withdrawing shifted sheets from the magazine, said withdrawing means being mounted on said movement effecting means.

14. The apparatus of claim 13, further comprising means for coupling said supports to each other, and said rotating means including a common prime mover for all of said shifting elements.

15. The apparatus of claim 13, wherein said supports include links which are pivotable relative to each other about at least one first axis, said shifting elements being rotatable about second axes which are substantially parallel to said first axis.

16. The apparatus of claim 13, wherein said rotating means further includes a prime mover and at least one endless flexible element which transmits torque from said prime mover to said shifting elements.

17. The apparatus of claim 13, further comprising means for agitating said withdrawing means with reference to said movement effecting means.

18. The apparatus of claim 13, wherein said rotating means includes a prime mover having means for transmitting limited torque to said shifting elements.

19. Apparatus for shifting randomly distributed sheets of different sizes in a magazine wherein the sheets form a stack of overlapping sheets including an outermost sheet and the magazine has a stop for the shifted sheets, comprising a plurality of discrete supports; a plurality of rotary shifting elements including at least one rotary shifting element on each of said supports; means for rotating said shifting elements, including a reversible motor for said shifting elements; and means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop in the magazine.

20. The apparatus of claim 19, further comprising overload clutches which enable said elements to come to a standstill when the resistance which the sheets in the magazine offer to rotation of said elements exceeds a predetermined value.

21. Apparatus for shifting randomly distributed sheets of different sizes in a magazine wherein the sheets form a stack of overlapping sheets including an outermost sheet and the magazine has a stop for shifted sheets, comprising a plurality of overload clutches including discrete supports; a plurality of rotary shifting elements including at least one rotary shifting element on each of said supports, each of said shifting elements having a peripheral sheet-engaging surface including smoother and coarser portions; means for rotating said shifting elements; and means for effecting a movement of the magazine and said supports relative to each other so as to place at least one of said shifting elements into engagement at least with the outermost sheet of the stack in the magazine whereby the at least one shifting element shifts the thus engaged outermost sheet toward the stop of the magazine, said overload clutches further comprising means which enable said elements to come to a standstill when the resistance which the sheets in the magazine offer to rotation of said elements exceeds a predetermined value.

* * * * *